(12) United States Patent
He et al.

(10) Patent No.: US 8,817,640 B2
(45) Date of Patent: Aug. 26, 2014

(54) SELECTION OF TRANSMISSION LOTS OF THE RELAXED DETERMINISTIC BACK-OFF METHODS IN THE MEDIUM ACCESS CONTROL

(75) Inventors: Yong He, Beijing (CN); Xiaojun Ma, Beijing (CN); Jianping Song, Beijing (CN); Guanghua Zhou, Beijing (CN); Jun Li, Cranbury, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 7 days.

(21) Appl. No.: 12/998,364

(22) PCT Filed: Oct. 20, 2009

(86) PCT No.: PCT/US2009/005685
§ 371 (c)(1),
(2), (4) Date: Apr. 13, 2011

(87) PCT Pub. No.: WO2010/047763
PCT Pub. Date: Apr. 29, 2010

(65) Prior Publication Data
US 2011/0194431 A1 Aug. 11, 2011

(30) Foreign Application Priority Data
Oct. 23, 2008 (EP) .................................. 08305713

(51) Int. Cl.
*H04J 1/16* (2006.01)
*H04W 74/08* (2009.01)
(52) U.S. Cl.
CPC .................................. *H04W 74/085* (2013.01)
USPC ......................................... 370/252; 370/310
(58) Field of Classification Search
None
See application file for complete search history.

(56) References Cited

U.S. PATENT DOCUMENTS

| 5,485,147 | A | 1/1996 | Jaffe |
| 7,327,707 | B2 * | 2/2008 | Qi et al. ...................... 370/331 |
| 2004/0030713 | A1 * | 2/2004 | Takano et al. ............... 707/102 |

FOREIGN PATENT DOCUMENTS

| WO | WO2006106459 | 10/2006 |
| WO | WO2006109213 | 10/2006 |
| WO | WO2009120332 | 10/2009 |

OTHER PUBLICATIONS

Broustis et al., "Multiband Media Access Control in Impulse-Based UWB Ad Hoc Networks", IEEE Transactions on Mobile Computing, vol. 6, No. 4, Apr. 2007.
He, Yong, et al., Deterministic Backoff: Towards Efficient Polling for 802.11e HCCA in Wireless Home Networks, Communications (ICC), 2010 IEEE International Conference, pp. 1-6.

* cited by examiner

*Primary Examiner* — Willie J Daniel, Jr.
(74) *Attorney, Agent, or Firm* — Robert D. Shedd; Jeffrey M. Navon; Catherine A. Cooper

(57) ABSTRACT

In the context of IEEE 802.11 WLAN networks, enhancement to the Relaxed Deterministic Backoff (R-DEB) for random access of shared (Medium Access Control MAC) method. For all available candidate resource slots, a busy index is calculated that reflects the level of use/occupation in the past and infers a probability of use in the future by another concurring device. The method assumes the use of a sub-set of resource slots for transmission, and updates this set by replacing resource slots for which collisions are frequent with a not currently used candidate resource for which the busy index is the lowest. Passive Spoofing/overhearing of all resources for clear channel assessment (CCS) is used for resource monitoring purposes.

5 Claims, 3 Drawing Sheets

SELECTION OF TRANSMISSION LOTS OF THE RELAXED DETERMINISTIC BACK-OFF METHODS IN THE MEDIUM ACCESS CONTROL

This application is a National Stage Application and claims the benefit, under 35 U.S.C. §365 of International Application PCT/US2009/005685 filed Oct. 20, 2009, which was published in accordance with PCT Article 21(2) on Apr. 29, 2010 in English, and which claims the benefit of EP patent application No. 08305713.3 filed Oct. 23, 2008.

CROSS-REFERENCE TO RELATED APPLICATIONS

This application claims priority to application EP 08305713.3 entitled "Selection of Triggering Events/Elements For Relaxed Deterministic Back-Off Method" filed 23 Oct. 2008, which is incorporated herein in its entirety.

FIELD OF THE INVENTION

The present invention relates to wireless communications and, in particular, to a method for selecting triggering events (also called elements herein) for a decentralized wireless access control method for multimedia applications.

BACKGROUND OF THE INVENTION

As used herein, "/" denotes alternative names for the same or similar components or structures. That is, a "/" can be taken as meaning "or" as used herein. Unicast transmissions are between a single sender/transmitter and a single receiver. Broadcast transmissions are between a single sender/transmitter and all receivers within receiving range of the transmitter. Multicast transmissions are between a single sender/transmitter and a subset of the receivers within receiving range of the transmitter where the subset of receivers with receiving range of the transmitter may be the entire set. That is, multicast may include broadcast and is therefore a broader term than broadcast as used herein. Data/content is transmitted in packets or frames. As used herein a station can be a node or a client device, which can be a mobile terminal or mobile device such as, but not limited to, a computer, laptop, personal digital assistant (PDA) or dual mode smart phone.

The popularity of voice and video applications over mobile computing devices has raised concerns regarding the performance of medium access control (MAC) protocols, which are responsible for allocating shared medium resources to multiple communicating stations and resolving collisions that occur when two or more stations access the medium simultaneously. In the current IEEE 802.11 wireless LANs, the distributed coordination function (DCF) of the MAC protocol layer uses a binary exponential back-off (BEB) algorithm for fundamental channel access. The BEB algorithm mitigates the issue of network collisions by randomizing the timing of medium access among stations that share the communication medium. However, as demonstrated by both practical experience and theoretical analysis, the BEB algorithm has some deficiencies. First, the collision probability for a transmission attempt increases exponentially with the number of active stations in the network, which significantly impairs the network throughput for large-scale networks. Second, the medium access delay cannot be bounded and the jitter is variable, which may not be suitable for multimedia applications. Third, the opportunity for medium access is not fair among stations. That is, a given station may gain access to the communication medium and get served for a long time. This results in other stations having to greatly defer their access to the medium. Moreover, it turns out that the use of doubling the contention window upon failed transmissions appears to give more transmission opportunities to these successful stations.

The concept of reducing or eliminating contention in contention-based networks was introduced by the present Applicants using a form of round robin scheduling in an earlier patent applications PCT Application Serial Numbers PCT/US2007/014607 and PCT/US2007/014608. This concept works well in contention-based networks where there is a centralized controller or coordinator, which can be the global repository of knowledge and equally importantly disseminate and distribute that global knowledge in order to coordinate the activities of the nodes or stations of the network.

To overcome the above-identified problems, an alternative back-off method—relaxed DEB (R-DEB) was described in EPO Application No. 08300154.5-2416. The R-DEB method improved the DEB algorithm in two ways. First, the R-DEB method fixed the back-off window to a predefined value. Second, the R-DEB method changed the frame transmission triggering condition by permitting multiple transmission opportunities when the back-off slot counters counted down from a maximum to a minimum. Randomization was introduced in the R-DEB algorithm during the selection of the triggering set. This enhanced its robustness against physical sensing error and increased the management flexibility, at the cost of a slight degradation of network efficiency. The R-DEB method was backward compatible with legacy IEEE 802.11 standards. Frames and packets are units of data. That is, data can be packaged in packets or frames or any other convenient format. As used herein a frame is used to indicate data/content packaged in a format for transmission.

In EPO Application No. 08300154.5-2416, the R-DEB method was introduced to overcome issues such as backward compatibility and dependability that were raised for the DEB algorithm. The R-DEB selected the back-off slot count in as deterministic a way as possible to avoid network collisions, and also R-DEB introduced randomness to the procedure to preserve the flexibility and ease of deployment which is a feature of random back-off algorithms such as BEB (binary exponential back-off). Hence, R-DEB made a compromise between the network efficiency and flexibility, and can be viewed as a combination of the DEB algorithm and BEB algorithm. The initial motivation of the R-DEB algorithm was to adapt the deterministic back-off for video transport systems while maintaining backward compatibility with the previous standards.

The R-DEB operates as follows. A back-off round starts when a station resets its back-off slot count slot(n) to the fixed number M (note that here n is a variable on the timeline). Once a station/node/client determines by the physical carrier sensing procedure that the shared medium is idle for a time slot, the station/node/client decreases its back-off slot count by one. If this new slot count satisfies the transmission triggering event/condition, or in other words the slot count is equal to one of the elements of the triggering set $Q_T$, e.g., slot(n)=k, then the station/node/client will get an opportunity to initiate a data transmission (hence "triggering a transmission"). If no frame is to be sent at this time, the station/node/client forgoes the opportunity and continues decreasing its slot count. The result of the transmission determines whether or not the element k should remain in the triggering set. A successful transmission allows this element remain in the triggering set, while an unsuccessful transmission will, with a probability p, trigger an element substitution procedure that replaces the old element k with a new element k' from the interval [0, M]. As the choice of k' may affect the performance of R-DEB, it is clear that a proper selection method should be designed to select k' as the new element for insertion into the triggering set $Q_T$. In EPO Application No. 08300154.5-2416, a random selection method was described to select k.

The random selection method included two main parts, random selection for each selecting attempt and p-persistent back-off upon failed transmission attempts. Each time that a station wanted to select and insert a new element from interval [0, M] into its triggering set $Q_T$, the station randomly selected a value from the integers available in the interval [0, M] that were currently not in its triggering set $Q_T$. Alternatively, a station maintained a history of past selections and the results of those selections. A station using this latter method would select those values that had fewer unsuccessful transmission attempts. For example, if during a recent period when selecting the value k as an element of the $Q_T$, the station encountered more network collisions than other choices, then the station will re-select k as a triggering element/value with a low probability. Hence, a table, histogram, matrix or other means could have been maintained for each integer from 0 to M along with the number of failed transmissions during the past period T when using this integer as a transmission trigger. The station would then select an integer with such a probability that it was negative proportional to the number of failed attempts during the past period T. For example, if r(k) denotes the record for integer k, then the station would select k as a new element of $Q_T$ with a probability $q_k$ computed by, $$q_k = \frac{r(k)}{\sum_{j \in Q_T} r(j)} \quad (1)$$

The p-persistent back-off mechanism was based on the case of an unsuccessful frame transmission. The station deleted the corresponding element k from the triggering set $Q_T$ with a predefined probability p and a new element had to be selected for insertion into the trigger set to makeup for the deleted element using the above described random selection method. This procedure continues persistently until an appropriate element was selected that yielded a successful transmission.

In the random selection method, a candidate integer in [0, M] was selected for insertion into the triggering set based on the history of transmission results when using that integer for transmission trigger during a past period. This approach is simple and easy to implement, since the information used for the selection decision was limited to local transmission records. In this sense the R-DEB method achieved completely distributed deterministic back-off for multiple access in wireless LANs (note that the original DEB algorithm relied on the central coordinator to disseminate/update the global information for each station). However, restricting the selection procedure to local information increases the possibility of network collisions. Specifically, if the two elements selected by station A and station B correspond to the same time slot on the time line of the shared medium, then the two stations would collide with each other when both use the two elements for medium access.

SUMMARY OF THE INVENTION

Intuitively, if the transmission results of neighboring stations using the same channel can be recorded by some reasonable means, for example, by passive snooping/overhearing, each station will have increased confidence in selecting the proper element from among the multiple candidates that possesses low collision probability with other stations. Herein a method is described that provides intelligent selection of the triggering set $Q_T$ for R-DEB. In the method of the present invention, each time selection of a new triggering element becomes necessary, the station will evaluate the collision probability of each candidate element based on the historical transmission records that the station has been able to record, and the station will select those elements with low collision probability for the triggering set. The history records of each element are completed on-line by persistent carrier sensing.

A new method is now introduced to improve the performance of R-DEB. This new method provides intelligent selection of the triggering set $Q_T$. Compared with the random selection algorithm, this new method further reduces the possibility of network collisions by reasonably selecting elements that are prone to giving a low probability of network collisions for insertion into the triggering set. By evaluating the history records of transmission results initiated by neighboring stations using the same channel, a mobile station can distinguish elements of low collision probability from others, and thus it can make a better selection decision. The idea is to choose those elements that have been rarely/scarcely used by other stations during the back-off rounds of the recent past which decreases the probability of transmission collisions in the network for the subsequent back-off rounds. Note that in EPO Application No. 08300154.5-2416 although the random selection algorithm used the history information for determining the triggering set, the history was limited to local information (the results of transmission attempts initiated by the station itself). Whereas, in the method of the present invention, the history information covers all network activities occurring over the shared medium (which can be overheard and as such recorded) so as to give a more accurate profile of the congestion level in the considered network. This new method is denominated herein the smart selection algorithm.

A method and apparatus are described including updating a history record for one of a plurality of candidate events, from a complementary triggering set, determining a busy index for each of said candidate events, determining a selection probability responsive to the busy index and selecting one of the plurality of candidate events in the complementary triggering set for insertion into a triggering set responsive to the selection probability.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Figure 1A:
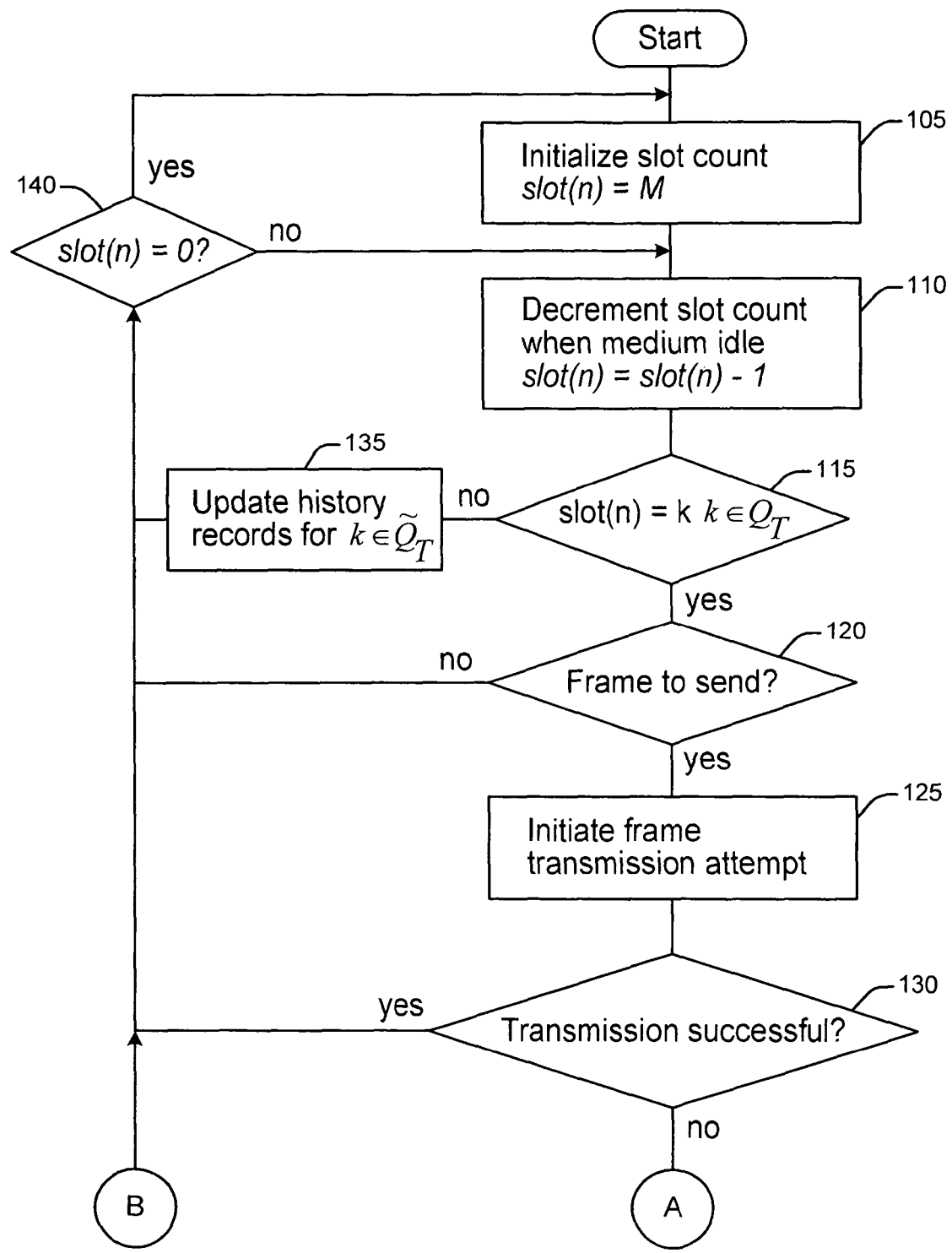
FIGS. 1A and 1B together are a flowchart of the event triggering selection method of the present invention.

For ease of explanation, $\tilde{Q}_T$ is denoted as the complementary set of $Q_T$ in the interval [0, M]. That is, $\tilde{Q}_T$ represents these elements not selected for insertion into the triggering set $Q_T$. The major task of smart selection algorithm of the present invention is, by evaluating the history records of each element in set $\tilde{Q}_T$, the station, executing the smart selection method of the present invention, selects those elements from set $\tilde{Q}_T$ that appear to be unlikely or less frequently to be used by other stations in the subsequent back-off rounds. In other words, for each element k in set $\tilde{Q}_T$, this method of the present invention predicts a collision probability when using k to trigger data transmissions, and those elements with low probabilities will be eventually be selected.

The smart selection method of the present invention builds on the hypothesis that, if an element in $\tilde{Q}_T$ has not been used much during the past several back-off rounds, then with a high probability, it will still not be used in subsequent back-off rounds. This hypothesis follows by observing two factors in the R-DEB algorithm. First, all stations share the same back-off cycle as M. The term M here represents the limit of the interval [0, M]. That is, M defines the periodicity of the backoff cycle for each station. Second, each station performs persistent carrier sensing to update its back-off slot count. The two factors preserve the relative slot count relationship among stations and make the R-DEB operate in a way that, in the view of shared medium, the medium is multiplexed by stations cyclically for every M time slots. Each time slot in a cycle is supposed to be used by a fixed group of stations that have one element in the triggering set corresponding to that time slot. Intuitively, for an element k in complementary triggering set $\tilde{Q}_T$ if the history records indicate that the time slot in each cycle corresponding to k is rarely used, then it is natural to infer that there are few stations in the network that have used that time slot, or little traffic present in that time slot. Hence, selecting k for insertion into the triggering set would yield a low probability of network collisions. This observation supports the smart selection method of the present invention.

Typically, the smart selection method of the present invention includes three individual components:
1) Online medium state recording, where a station senses the medium and records the medium state for each element in $\tilde{Q}_T$ for each back-off round.
2) A busy index calculation, where a busy index that indicates the estimated degree for the medium state to become busy at the corresponding time slot in the subsequent back-off rounds is derived from the medium state records for each element in $\tilde{Q}_T$;
3) Element selection, where a station determines the best element to select for insertion into the triggering set based on the calculated busy index.

Each component is described hereinafter as follows.

The online recording procedure records the medium state for each element in the set $\tilde{Q}_T$ as the network evolves. As time passes, the slot count of each station cycles through M to 0. Considering the value of a station's slot count in each backoff cycle, the station's slot count starts with a value M, and at each idle time slot, it is decremented by one until it reaches zero. Upon reaching zero, it again is reset to the maximum M. As the slot count decreases, it may encounter one or more triggering elements. Those elements are selected from the interval [0, M] as described herein. At each time slot, for example when $slot_i(n)=k$, the station i utilizes the clear channel assessment (CCA) mechanism provided at the physical layer to perform carrier sensing in order to determine whether or not the shared medium is busy at that time slot. The results of the carrier sensing are added to a table or list which records the medium state for each element of $\tilde{Q}_T$. For example, a station may be required to record the medium state over the latest L cycles for each element in $\tilde{Q}_T$ and construct a table like:

|   | Cycle 0 | Cycle-1 | Cycle-2 | Cycle-3 | ... | Cycle-(L − 1) | Cycle-L |
|---|---|---|---|---|---|---|---|
| 0 | 0 | 1 | 1 | 0 | ... | 1 | 0 |
| 1 | 1 | 1 | 0 | 0 | ... | 0 | 1 |
| . | . | . | . | . | . | . | . |
| . | . | . | . | . | . | . | . |
| k | 1 | 0 | 1 | 1 | ... | 1 | 0 |
| . | . | . | . | . | . | . | . |
| . | . | . | . | . | . | . | . |
| M | 0 | 1 | 0 | 0 | ... | 1 | 1 | where each row represents the medium state for an element in $\tilde{Q}_T$ over L cycles and each column gives the medium's state for all elements in a cycle. A cell in the table indicates the medium state, for example, by 1 (busy) or 0 (idle). It should be noted that these two sates could be reversed with no loss of generality. Hence, by this table, a station determines the medium state for an element in $\tilde{Q}_T$ during the latest L back-off cycles.

The broadcast nature of the shared medium facilitates a passive recording procedure. For each time slot, all the station needs to do is decreasing/freezing its slot count according to the medium sensing results, and timely adding those results to the table. Since the R-DEB algorithm requires that persistent carrier sensing should be performed to synchronize the changing of distributed slot counts, updating the history table can be performed together with the sensing procedure and thus, it should not incur extra overhead for the system using the R-DEB method.

The history table (or histogram) should be efficiently managed and it should be updated every time slot. For example, the station can store the table by means of multiple queues, each queue corresponding to one element (one row in the table). A position indicator is used for a queue to track the position of the latest inserted record in the queue, which accelerates querying and insertion of new record into the queue. Any other of a number of data structures known in the art could be used.

All the historical records are used as the basis to derive the busy index (BI), which expresses the confidence of the shared medium to become busy at the time slot corresponding to the considered element. For element k in $\tilde{Q}_T$, denote $r_{-1}$, $r_{-2}$, ..., $r_{-L}$ as the medium state when slot count equals k during the past L back-off cycles, then the busy index is computed/calculated/determined for element k by some function F:

$$BI(k)=F(r_{-1},r_{-2},\ldots,r_{-L})$$

Function F should be carefully designed to give an accurate profile of the historical records. Given records $r_{-1}, r_{-2}, \ldots, r_{-L}$, F should give a value (the busy index) which reflects the estimation or prediction of the medium state at the time slot corresponding to k in subsequent back-off rounds. Since a positive history record is more likely to give preference to a busy state in a future back-off round than a non-positive record, F appears to be a monotonically increasing function with the records $r_{-1}, r_{-2}, \ldots, r_{-L}$. That is $$F(r_{-1},r_{-2},\ldots,r_{-j}=1,\ldots,r_{-L})>F(r_{-1},r_{-2},\ldots,r_{-j}=0,\ldots,r_{-L}), \text{ for any } j$$

For example, F can be chosen as $$F = \frac{\sum_{i=1}^{L} r_{-i}}{L}$$

to calculate the busy index. Or as a more general form, F can be expressed as $$\begin{cases} F = \alpha \cdot r_{-1} + \beta \cdot r_{-2} + \gamma \cdot r_{-3} + \ldots \\ 1 = \alpha + \beta + \gamma + \ldots \end{cases}$$

Once the busy index for each element in set $\tilde{Q}_T$ has been computed/calculate/determined, then the best proper elements from set $\tilde{Q}_T$ are selected for insertion into the triggering set $Q_T$. In one approach, those elements with lowest busy index will be selected as the candidates for the triggering set, and a random selection method will be applied if there is a tie. This approach is simple and straightforward, with a risk that when element selection occurs simultaneously among multiple stations, it is probable that the elements selected by these stations correspond to the same time slot for the shared medium. This is true since in ideal conditions, for elements corresponding to the same time slot, the busy index calculated by each station should be identical. Hence, the elements selected by each station with lowest busy index, may result in collisions with each other with a high probability.

To reduce the risk of colliding selection of elements by multiple stations, as another approach, the selection procedure is randomized. That is, the probability for element k in complementary triggering set $\tilde{Q}_T$, to be selected for insertion into the triggering set is given by $$q(k) = \frac{BI(k)^{-1}}{\sum_{i \in \tilde{Q}_T} BI(i)^{-1}}$$

In this approach, those elements with lower busy index will be selected for insertion into the triggering set with a higher probability than those with higher busy index. By introducing randomization, the possibility of collision triggering elements among stations can be reduced. Still, there may have other functions to produce the probability q(k) that are appropriate for the selection procedure.

Figure 1B:
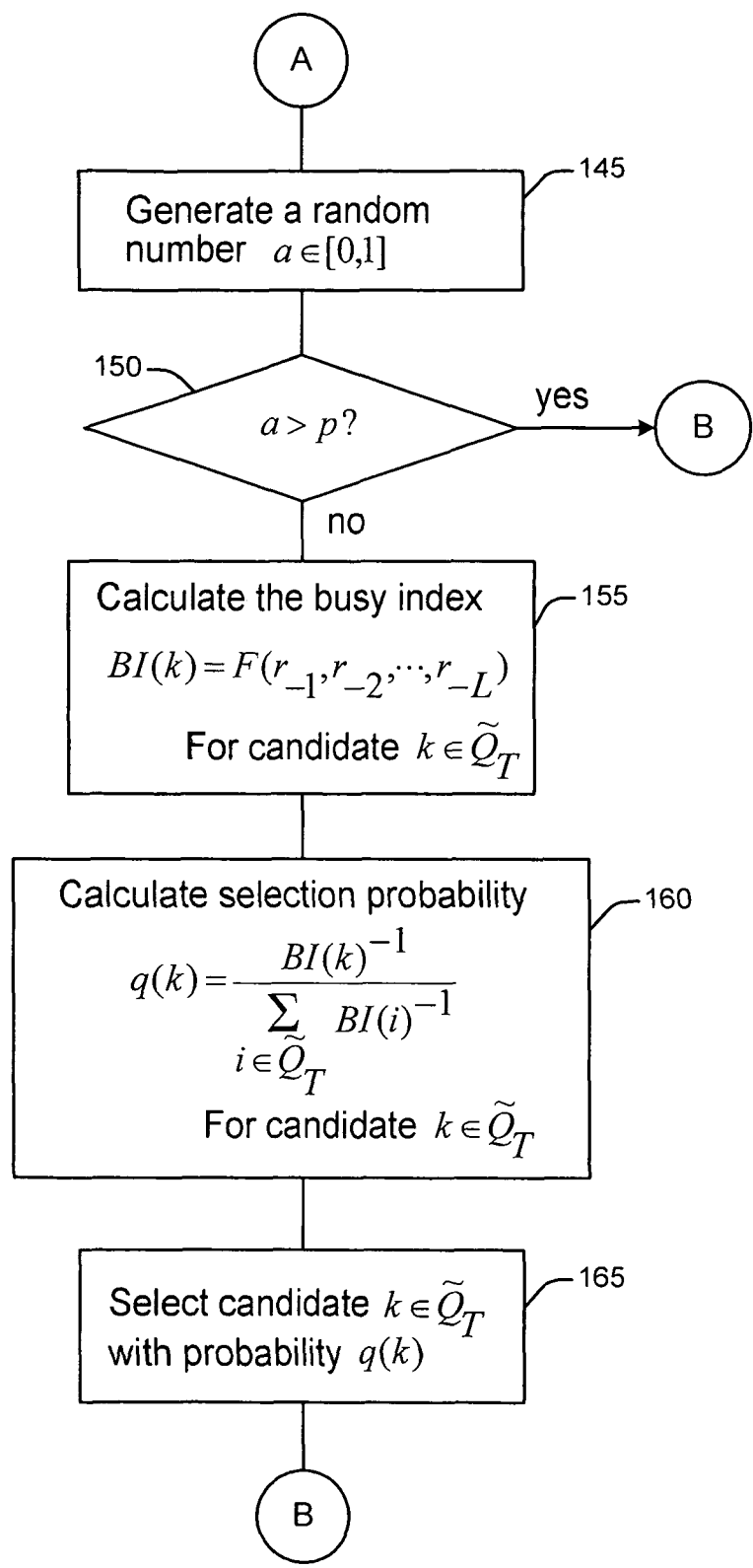

FIGS. 1A and 1B together are a flowchart of the event triggering selection method of the present invention as practiced in a station/mobile terminal/mobile device/node/client. At 105 the slot count initialized. The slot count is decremented at 110 when the communications medium (e.g., channel) is idle. At 115 a test is performed to determine if the slot count is equal to a triggering event. If the slot count is equal to a triggering event then at 120 a test is performed to determine if there is data/content (data/content is formatted as a frame or packet or any other convenient structure) to send. If there is a frame to send then at 125 data/content transmission (as, for example, as a frame) attempt is initiated. A test is performed at 130 to determine if the data/content transmission was successful. If the data transmission was successful then a test is performed at 140 to determine if the slot count is the minimum of the interval (e.g., zero). If the slot count is at the minimum of the interval then processing continues at 105. If the slot count is not at the minimum of the interval then processing continues at 110. If there was no data/content (frame) to send at 120 then processing continues at 140. If the slot count was not equal to a triggering event then at 135 the history record for the current slot count is updated.

If the attempted data/content transmission was not successful at 130, then a random number is generated at 145. A test is performed at 150 to determine if the random number is greater than p, where p is a threshold/probability that a failed transmission will cause the selection of a new triggering event/element from the complementary triggering set. If the random number is less than or equal to p, then at 155 a busy index is calculated/computed/determined for the candidate element/event. At 160 the selection probability is calculated/computed/determined for the candidate element/event. At 165 an element/event is selected responsive to the selection probability. Processing continues at 140.

Figure 2:
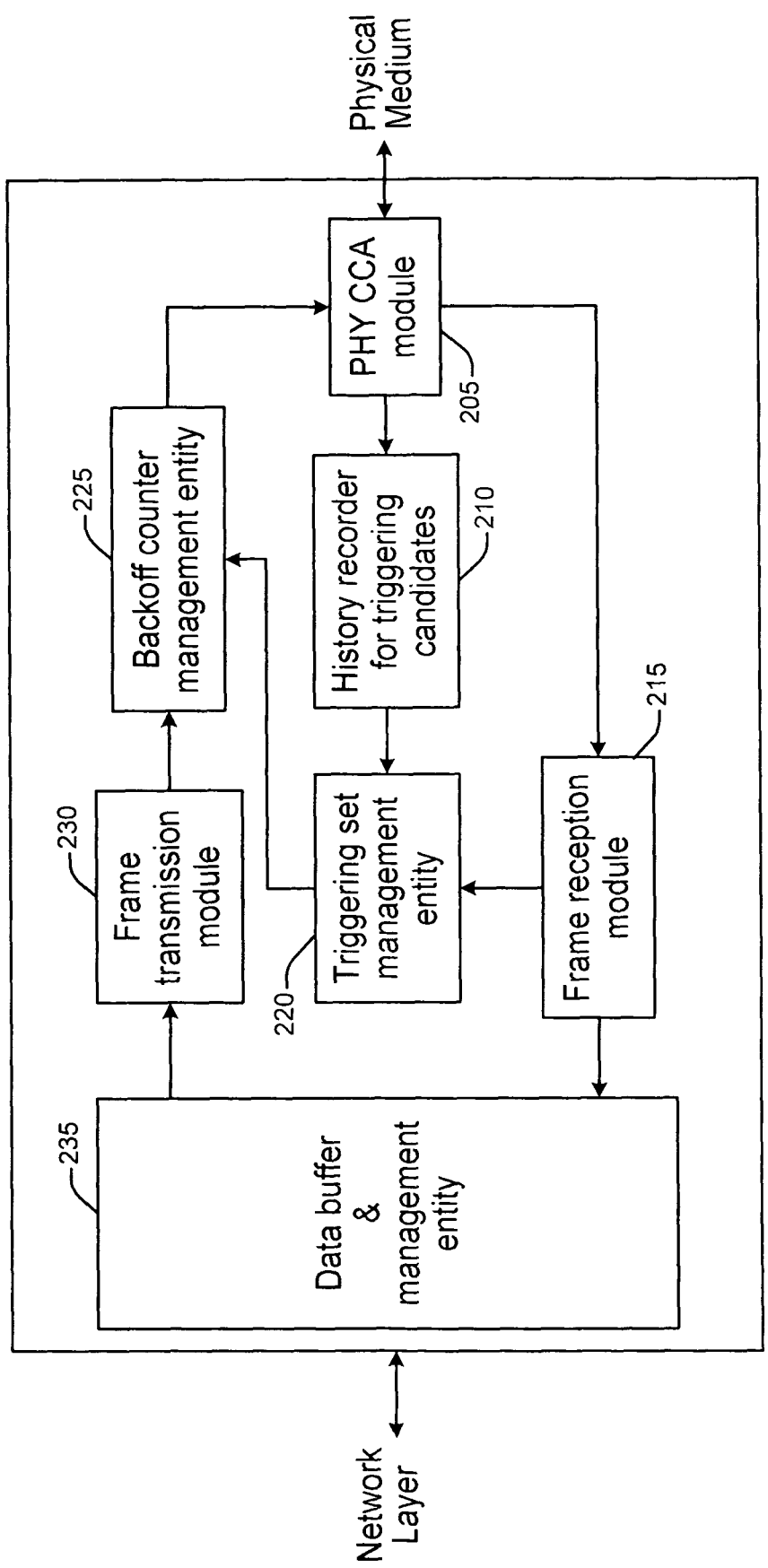
FIG. 2 is a block diagram of an exemplary embodiment of the present invention.

FIG. 2 is a block diagram of an exemplary embodiment of the present invention. The block diagram is between the physical and network layer and therefore, is at the MAC layer. The physical medium interfaces with the present invention via the physical/clear channel assessment (PHY/CCA) module 205. PHY/CCA module provides input to history recorder for triggering candidate event/elements module 210, which records the sample state of the communications medium at each time slot to update the record of channel utilization for those elements/events in the set of events/elements not in the triggering set. PHY/CCA 205 also provides input to frame (data/content) reception module 215 is the module that processes received frames (data/content). Triggering set management entity module 220 receives input from history recorder for triggering candidate events/elements module 210 and from frame (data/content) reception module 215. Triggering set management entity module 220 is responsible for determining and maintaining an appropriate triggering set for the method of the present invention. The smart selection method of the present invention is employed once a failed transmission attempt is detected. The triggering set management entity module provides input to the backoff counter management entity module 225, which controls decreasing and resetting of the backoff slot counter responsive to the status of the medium (the clear channel assessment status). The backoff counter management entity module 225 provides input to PHY/CCA module 205. Frame (data/content) reception module 215 also provides input to data buffer and management entity module which manages the data/content buffers. Data buffer and management entity module 235 interfaces with the network layer and also provides input to the frame transmission module 230, which process data/content for transmission. The frame transmission module 230 provides input to backoff counter management entity module 225.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for a node to select triggering events for multimedia applications in a decentralized wireless access control system, said method comprising:
   updating a history record, by said node, for each of a plurality of candidate events, said candidate events being in a complementary triggering set, said updating of said history record being performed by carrier-sensing;
   first determining, by said node, a busy index for each of said candidate events;
   second determining, by said node, a selection probability responsive to said busy index, wherein said selection probability for candidate event k is given by $$q(k) = \frac{BI(k)^{-1}}{\sum_{i \in \bar{Q}_T} BI(i)^{-1}},$$

where BI(k) is said busy index for one of said candidate events (k), and $$\sum_{i \in \bar{Q}_T} BI(i)$$

is the summation of the busy indices for each of said candidate events in said complementary triggering set; and selecting, by said node, one of said plurality of candidate events in said complementary triggering set for insertion into a triggering set responsive to said selection probability.

2. The method according to claim 1, wherein said first determining act is performed upon detection of a failed data transmission attempt.

3. The method according to claim 1, further comprising:
   calculating a random number; and
   comparing said random number to a threshold, where said threshold is a probability that a failed data transmission attempt causes said selecting act to be performed.

4. An apparatus for selecting triggering events for multimedia applications in a decentralized wireless access control system, comprising:
   means for updating a history record for each of a plurality of candidate events, said candidate events being in a complementary triggering set, said updating of said history record being performed by carrier-sensing;
   means for first determining a busy index for each of said candidate events;
   means for second determining a selection probability responsive to said busy index, wherein said selection probability for candidate event k is given by $$q(k) = \frac{BI(k)^{-1}}{\sum_{i \in \bar{Q}_T} BI(i)^{-1}},$$

where BI(k) is said busy index for one of said candidate events (k), and $$\sum_{i \in \bar{Q}_T} BI(i)$$

is the summation of the busy indices for each of said candidate events in said complementary triggering set; and
   means for selecting one of said plurality of candidate events in said complementary triggering set for insertion into a triggering set responsive to said selection probability.

5. The apparatus according to claim 4, wherein said first and second determining acts and said selecting act are performed by a triggering set management entity module.

* * * * *